United States Patent
Smith

(10) Patent No.: US 7,849,791 B2
(45) Date of Patent: Dec. 14, 2010

(54) OPTIMIZED BALER TAILGATE CYCLE

(75) Inventor: Kevin M. Smith, Narvon, PA (US)

(73) Assignee: CNH America LLC, New Holland, PA (US)

( * ) Notice: Subject to any disclaimer, the term of this patent is extended or adjusted under 35 U.S.C. 154(b) by 169 days.

(21) Appl. No.: 12/267,757

(22) Filed: Nov. 10, 2008

(65) Prior Publication Data

US 2010/0115911 A1 May 13, 2010

(51) Int. Cl.
*B30B 5/06* (2006.01)
*A01F 15/07* (2006.01)

(52) U.S. Cl. .......................... 100/88; 56/341
(58) Field of Classification Search ............... 100/2, 100/35, 87, 88, 89; 56/341
See application file for complete search history.

(56) References Cited

U.S. PATENT DOCUMENTS

| | | | |
|---|---|---|---|
| 1,979,569 A * | 11/1934 | Parvin | .......................... 318/265 |
| 4,344,272 A | 8/1982 | Gaudette et al. | |
| 4,770,093 A | 9/1988 | Gunther et al. | |
| 5,159,876 A | 11/1992 | Olin | |
| 5,513,942 A | 5/1996 | Pickrell | |
| 5,595,055 A | 1/1997 | Horchler, Jr. et al. | |
| 5,622,104 A | 4/1997 | Viesselmann et al. | |
| 6,272,825 B1 | 8/2001 | Anderson et al. | |
| 6,644,006 B1 | 11/2003 | Merritt et al. | |
| 7,055,425 B2 * | 6/2006 | Viaud et al. | .................... 100/88 |
| 7,472,649 B1 * | 1/2009 | Derscheid et al. | ............. 100/88 |
| 2005/0045051 A1 | 3/2005 | Viaud et al. | |
| 2005/0247215 A1 | 11/2005 | Bizoirek et al. | |

FOREIGN PATENT DOCUMENTS

| | | |
|---|---|---|
| DE | 4012738 | 8/2001 |
| EP | 1444882 | 8/2004 |

* cited by examiner

*Primary Examiner*—Jimmy T Nguyen
(74) *Attorney, Agent, or Firm*—Patrick M. Sheldrake; Michael G. Harms

(57) ABSTRACT

A round baler has a tailgate moveable between a closed position in which the tailgate extends along the back side of the baling chamber and an open position in which a completely formed bale can be discharged from the baling chamber and a controller programmed to open and close the tailgate in response to a bale discharge signal. The tailgate opens and closes initially relatively quickly and then more slowly as the tailgate approaches the fully open or fully closed position, the rate of opening and closing being determined by the period of time lapsing from the bale discharge signal.

20 Claims, 6 Drawing Sheets

OPTIMIZED BALER TAILGATE CYCLE

FIELD OF THE INVENTION

The present invention relates generally to package crop balers, and more particularly to an improved system and method of raising and closing the tailgate of a round baler.

BACKGROUND OF THE INVENTION

For many years agricultural balers have been used to consolidate and package crop material so as to facilitate the storage and handling of the crop material for later use. Usually, a mower-conditioner cuts and conditions the crop material for windrow drying in the sun. When the cut crop material is properly dried, a round baler is pulled along the windrows to pick up the crop material and form it into cylindrically shaped round bales. More specifically, the pickup of the baler gathers the cut and windrowed crop material from the ground and then conveys the cut crop material with a conveyor, such as a rotating conveying rotor, into a bale-forming chamber within the baler. The pickup assembly has a drive mechanism that operates to activate both the pickup and the conveying rotor, and the pickup drive mechanism is operably connected to and driven by the main drive mechanism of the baler. The baling chamber consists of a pair of opposing sidewalls with a series of belts that rotate and compress the crop material into a cylindrical shape. When the bale has achieved a desired size and density, the round baler wraps the bale with twine or other wrapping material, such as film or net, to ensure that the bale maintains its shape and density. Then the operator raises the tailgate of the baler and ejects the bale onto the ground. The tailgate is then closed and the cycle repeated as necessary and desired to manage the field of cut crop material.

The rotor conveyor mechanism ("rotor" or "rotor mechanism") between the pickup and the bale-forming chamber is, itself, known in the prior art, as shown, for example, in Horchler, Jr. et al. U.S. Pat. No. 5,595,055 and Merritt U.S. Pat. No. 6,644,006. The rotor mechanism is usually referred to as the "stuffer", because it stuffs the crop material into the gap between the floor roll and the starter roll into the bale-forming chamber.

Opening and closing of the tailgate has been controlled by a flow valve, which was located between a source of pressurized hydraulic fluid and an actuator. The position of the flow valve was controlled by a hydraulic lever. To increase efficiency, the rate of opening and closing of the tailgate should be rapid. However, such rapid movement of the tailgate can lead to damage to the baler. Therefore, to slow the rate of opening and closing near the end of the opening or closing portion of the cycle, the hydraulic valve has been "feathered" by positioning the hydraulic lever between its fully open position and its fully closed position. This solution depends on the skill of the operator and requires the attention of the operator.

Exemplary prior art tailgate opening and closing mechanisms, which do not vary the speed of opening or closing, are shown in Viesselmann et al. U.S. Pat. No. 5,622,104 and Anderson U.S. Pat. No. 6,272,825. Biziorek et al. U.S. Patent Application Publication No. 2005/0247215 discloses a round baler that varies the speed of the opening and closing of the tailgate using tailgate position sensors.

In order to prevent rapid decelerations of the tailgate when it meets its closing stops, the Viesselmann system includes an orifice 108 (shown in FIG. 2) that continuously slows the flow of oil to and from the tailgate hydraulic actuators 62 to effectively cushion the closing of the tailgate. The flow restriction valve assembly 194 of Anderson (shown in FIG. 3) is either open or closed and prevents the tailgate 34 from slamming shut. The result is that the tailgate motion is slowed and the open and close cycle time of the tailgate is increased, making the baling operation less efficient.

To improve efficiency, it is desirable to restrict flow of the fluid to the actuator 36 only near the end of the opening and closing motions. While the flow of hydraulic fluid to the tailgate actuator 30 of Biziorek (shown in FIG. 1) is regulated by valve device 48, the control system of Biziorek requires a number of position sensors, including sensors 38, 42 and 44 and one not shown, to determine the position of the tailgate 26. The addition of the position sensors increases the cost of the baler due to increased installation cost, as well as the addition of components that are subject to failure.

SUMMARY OF THE INVENTION

In one preferred embodiment, a round baler has a baling chamber with a tailgate in a rear section of the baling chamber. The tailgate is moveable between a closed position, wherein the tailgate extends along a backside of the baling chamber, and an open position, wherein a completely formed bale can be discharged from the baling chamber. An actuator is connected to the tailgate to move the tailgate between the open and closed positions. A flow valve is in fluid communication between the actuator and a source of pressurized fluid. A controller is electrically connected to the flow valve to control the flow of fluid to the actuator. An activation device is manually activatable to commence an open cycle and a close cycle of the tailgate. The controller is programmed to open the tailgate at a first rate of speed during a first predetermined period of time and to continue opening the tailgate at a second slower rate of speed during a second predetermined period of time.

Another embodiment of the invention is a method of opening and closing a tailgate of a round baler in which the round baler having (a) a baling chamber with a tailgate in a rear section of the baling chamber, the tailgate being moveable between a closed position, wherein the tailgate extends along a back side of the baling chamber, and an open position, wherein a completely formed bale can be discharged from the baling chamber, (b) an actuator connected to the tailgate so as to be capable of moving the tailgate between the open position and the closed position, (c) a flow valve in fluid communication between an actuator and a source of pressurized fluid, (d) a controller electrically connected to the flow valve to control the flow of fluid to the actuator; and (e) an activation device, manually activatable to commence an open cycle and a close cycle of the tailgate is provided. Upon Initiation of an open cycle and a close cycle, the tailgate opens at a first rate of speed during a first predetermined period of time and continues to open the tailgate at a second slower rate of speed during a second predetermined period of time.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE INVENTION

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail.

Figure 1:
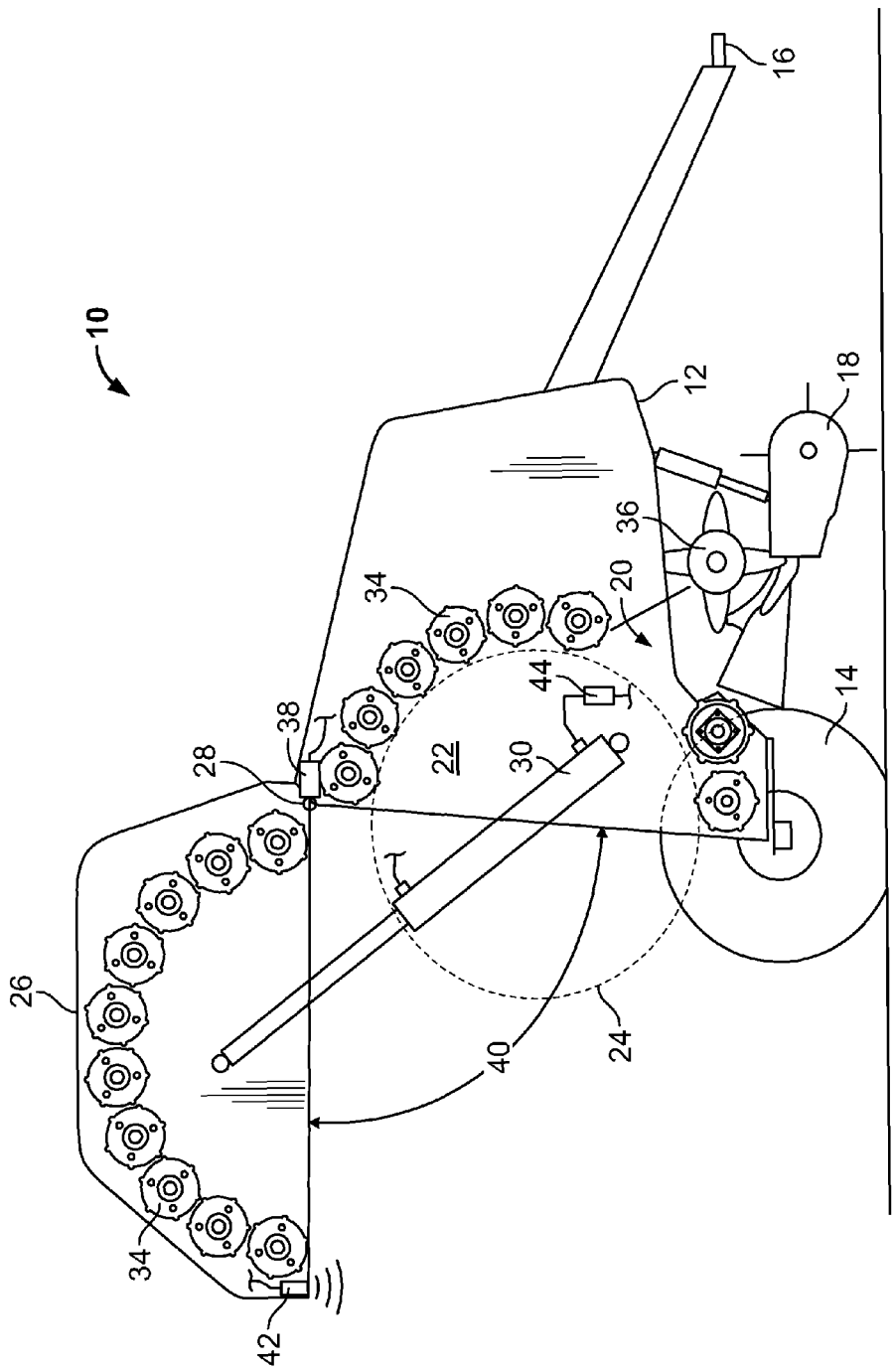
FIG. 1 is a schematic side view of a prior art round baler.
Figure 2:
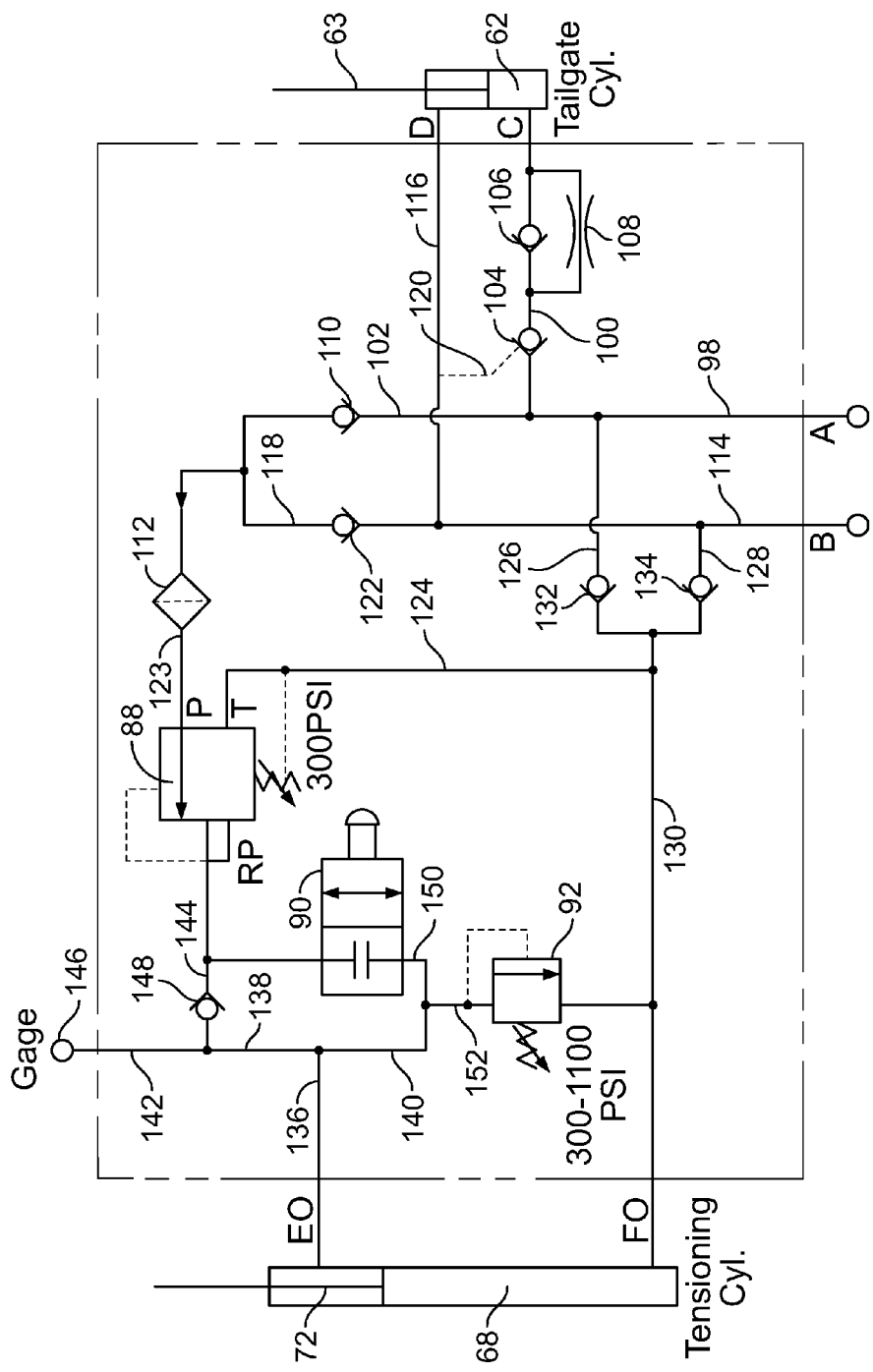
FIG. 2 is a schematic diagram of a hydraulic circuit for a round baler of the prior art.
Figure 3:
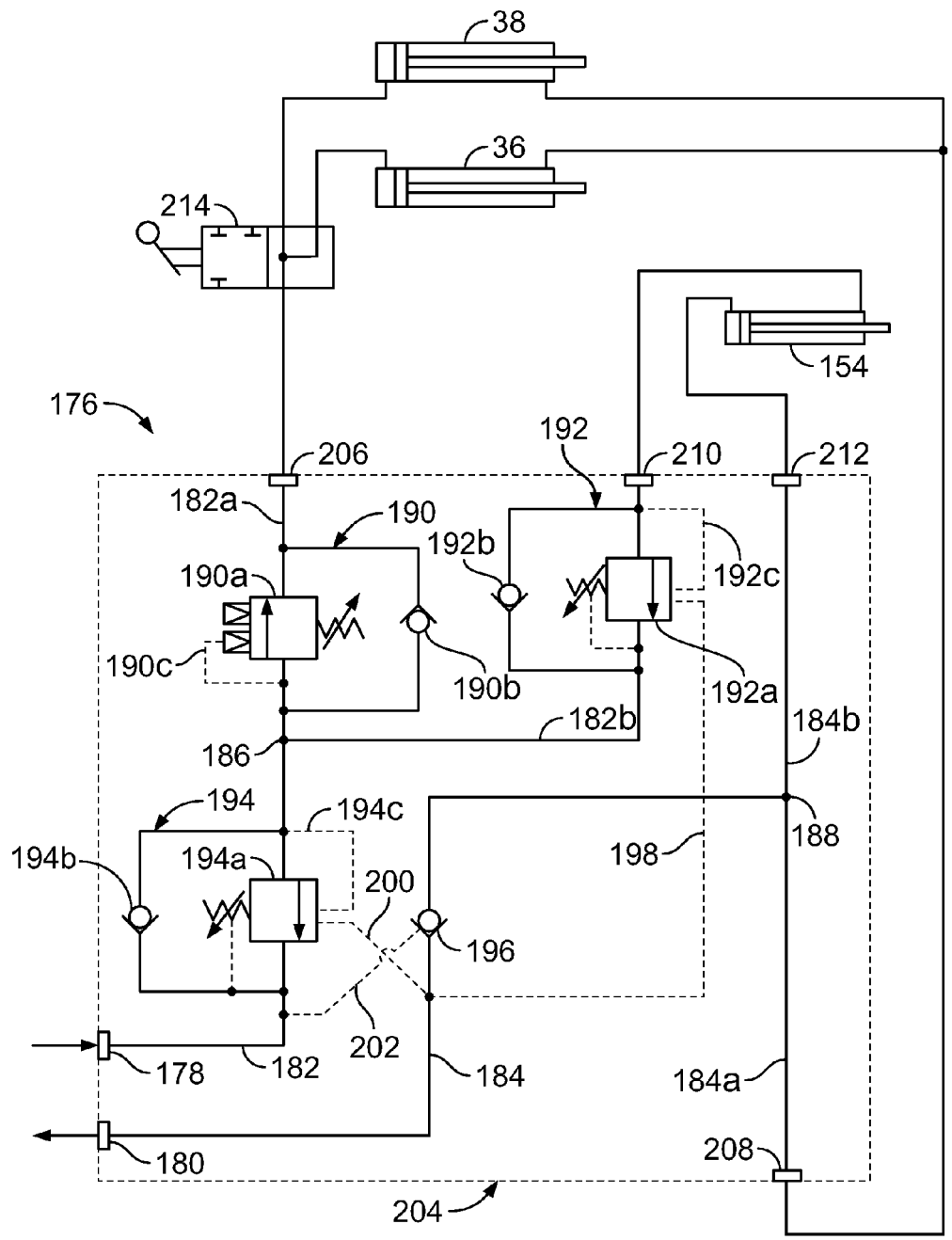
FIG. 3 is a schematic diagram of a second hydraulic circuit for a round baler of the prior art.
Figure 4:
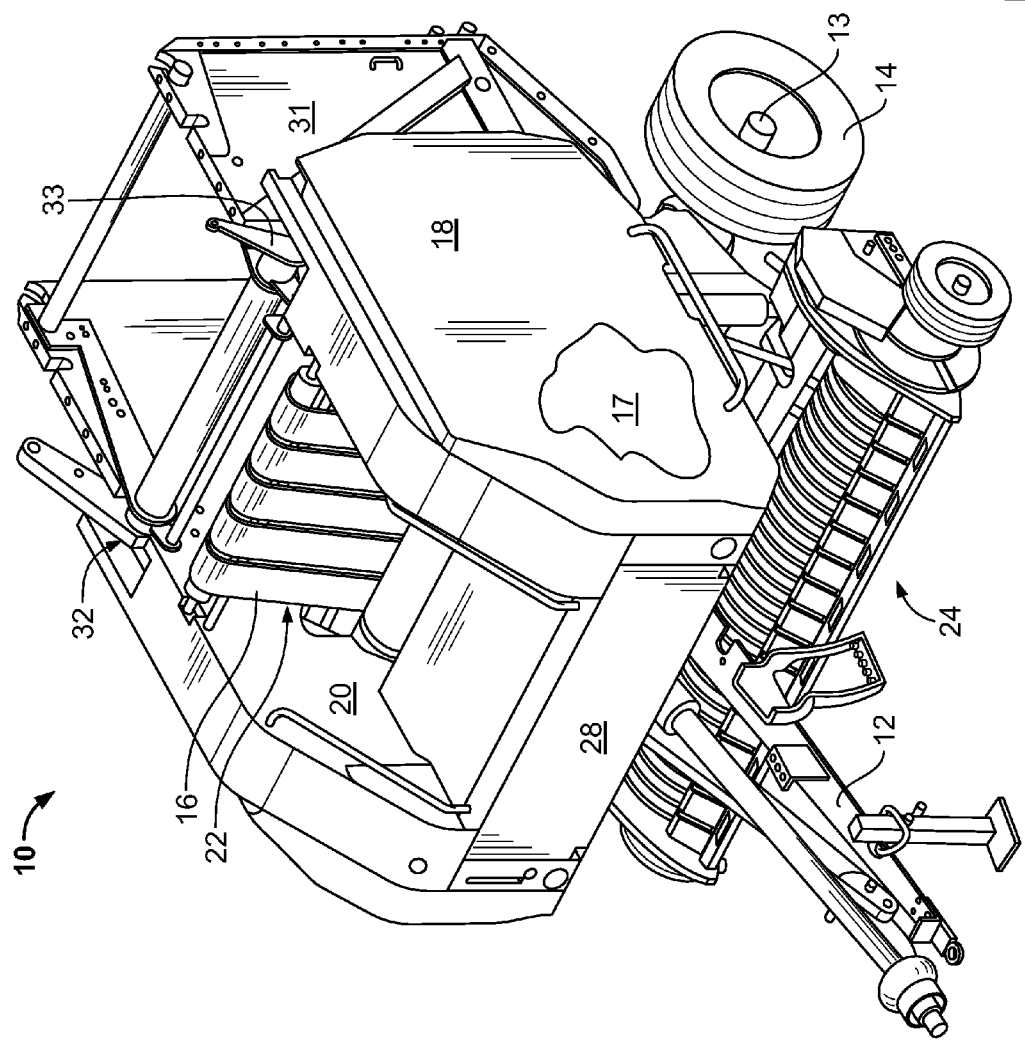
FIG. 4 is a forward and top perspective view of a round baler of the type which could employ the apparatus of the instant invention with a tailgate in a closed position.
Figure 5:
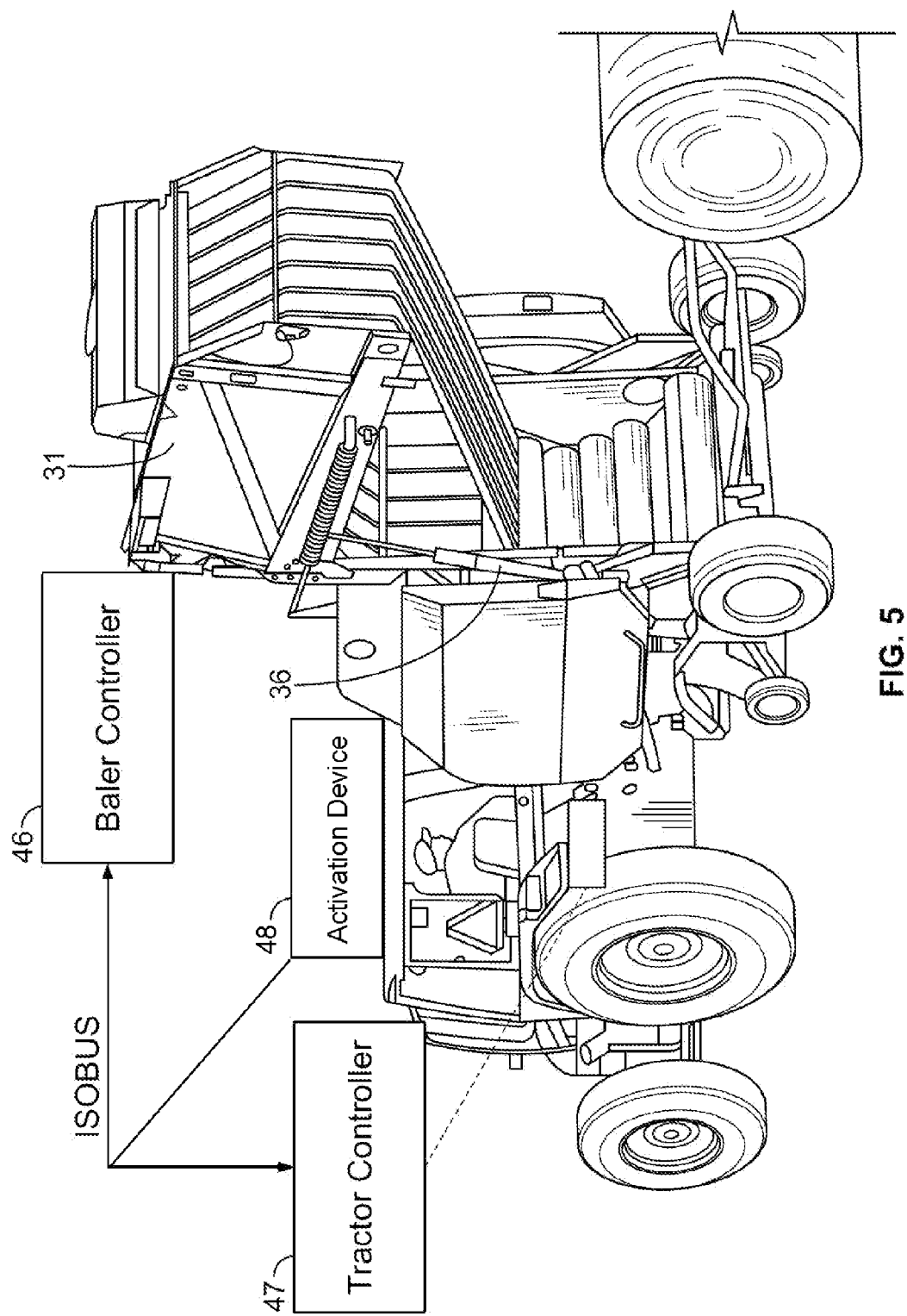
FIG. 5 is a rear and side perspective view of a round baler of the type which could employ the apparatus of the instant invention with a tailgate in an open position.

Referring to FIG. 4, a generally well-known round baler 10, with which the baler tailgate opening and closing system of the present invention can be used, is shown to include a main frame terminating forwardly in a tongue 12 and rearwardly slightly beyond a transverse axle 13 to which a pair of wheels 14 (only one shown) is mounted—thus forming a wheel supported main frame (not shown in detail). The main frame supports a series of belts 16 and floor rolls (not shown), which together with a first sidewall 17 (shown in the breakout) behind and generally parallel to cover panel 18 and a second sidewall 20, collectively forming a bale-forming chamber 22. Cut crop material is picked up by transverse pickup 24 and fed into bale-forming chamber 22 where it is, as discussed above, formed into a cylindrically shaped ball (not shown in FIG. 4). The bale is then wrapped with twine or a wrapping material dispensed from a wrapping mechanism generally behind shield 28. Upon completion of the wrapping process, the tailgate 31 pivots upwardly about pivot points 32, 33 and the bale is discharged onto the ground. As shown in FIG. 5, a tailgate 31 is in the open position when actuator 36 is in an extended position.

The present system does not require the use of sensors to determine the position of the tailgate 31. As shown in FIG. 5, in one embodiment, there are two controllers, baler controller 46 and tractor controller 47. The tractor controller 47 contains information concerning the maximum fluid flow from the source of pressurized fluid to the flow valve 50, 52 (shown in FIGS. 6 and 7). The baler controller 46 uses the maximum fluid flow rate to calculate the desired flow and opening and closing times. The baler controller 46 communicates these calculations to the tractor controller 47. The baler controller 46 and the tractor controller 47 control the desired fluid flow to the tailgate actuator 36 by controlling the position of the flow valve 50, 52.

Figure 6:
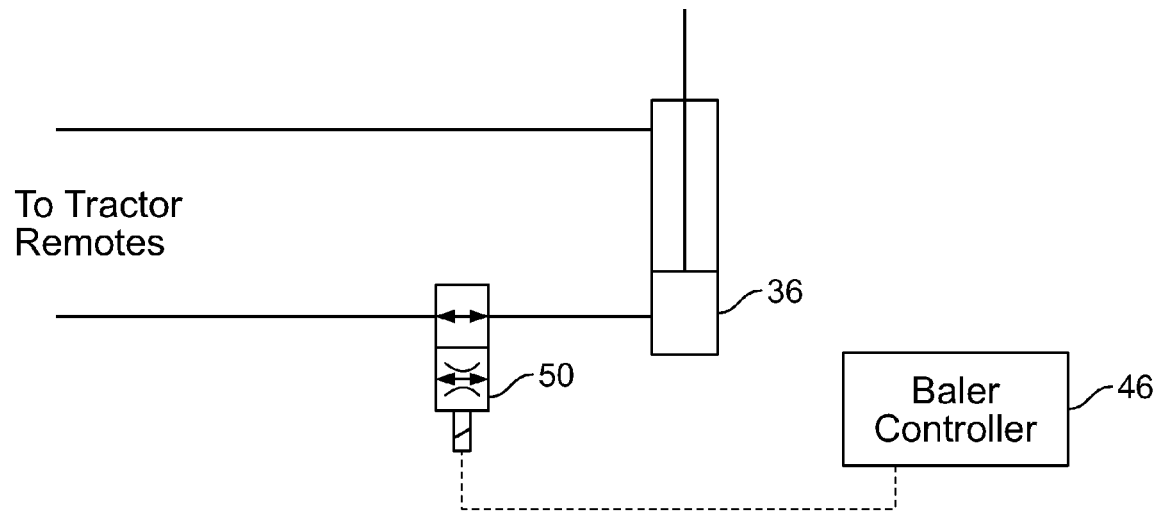
FIG. 6 is a schematic representation of a first fluid system and controller of the instant invention.

Flow valve 50 in FIG. 6 may be a solenoid activated, 2-position valve. In one position, flow valve 50 allows full flow to the tailgate actuator 36 (shown), while in the other position an orifice of reduced cross sectional area or size restricts flow. While raising the tailgate 31, flow valve 50 is in the full flow position until the tailgate 31 nears its fully open position, then the flow valve 50 shifts to the restricted flow position to decelerate or slow the opening motion of the tailgate 31 as the tailgate approaches the fully opened position. While closing the tailgate 31, flow valve 50 is in the full flow position until the tailgate 31 nears the closed position, then the flow valve 50 shifts to the restricted flow position to slow the tailgate closing motion.

The time duration for the tailgate 31 to near its fully open position from its closed position is determined and programmed into the baler controller 46. The time duration is a function of the size of the actuator 36, the distance the actuator moves, and on the available hydraulic oil flow. If dimensions of the round baler 10 and actuator are known, the time to open the tailgate 31 can be calculated. Other factors such as fluid pressure, line size, and tailgate weight can also be used to determine the time durations. The desired flow can be maintained by a pressure compensating flow control valve (not shown).

In one embodiment, the tailgate 31 opens and closes with the flow valve 50, 52 in the fully open position until the tailgate reaches a near open position or closed position. The time duration to the near open position or closed position can be control by a rotary switch (not shown) or other operator input into the baler controller 46, such as a keyboard.

If conditions change, such as fluid leaking past the actuator seal, resulting in different period of time for the tailgate 31 to near its fully open position, the baler controller 46 can be reprogrammed by the operator to change the period of time during which the tailgate 31 opens more quickly and/or the period of time during which the tailgate 31 opens at a slower rate of speed using the rotary switch, for example.

In another embodiment, the period of time during which the tailgate 31 changes opening and closing speed is constant. For instance, during the opening cycle, the speed of tailgate 31 ramps up from zero to a maximum speed over a desired, constant period of time and as the tailgate 31 approaches its near open position, the speed at which the tailgate 31 opens decreases to zero as a ramp function over a specific, constant period of time. Likewise, during the closing cycle, the speed of the tailgate 31 ramps up from zero to a maximum speed over a desired, constant period of time and as the tailgate 31 approaches its near closed position, the speed at which the tailgate 31 closes decreases to zero as a ramp function over a specific, constant period of time. In this embodiment, the opening and closing times are adjusted by adjusting the period of time during which the tailgate 31 is opening or closing at its maximum rate of speed.

In a similar manner, the time duration for the tailgate 31 to near its fully closed position from its open position is determined and programmed into the baler controller 46. The time duration is a function of available hydraulic flow, cylinder dimensions, and other factors. If conditions change resulting in a different period of time for the tailgate 31 to near its fully closed position, the baler controller 46 can be reprogrammed by the operator to change the period of time during which the tailgate 31 closes more quickly and/or the period of time during which the tailgate 31 closes at a slower rate of speed.

Once a full bale is in the bale-forming chamber 22, the operator stops forward travel of the round baler 10. The bale is then automatically or manually wrapped and ready to be discharged. The opening portion of the open and close cycle is then initiated manually by pushing a button or repositioning a lever or toggle switch (48). The closing portion of the open and close cycle can be initiated manually after the completely formed bale is discharged or automatically after a predetermined period of time after initiation of the opening portion of the open and close cycle.

The flow valve 50 in FIG. 6 can be replaced with a solenoid activated, 3-position valve (not shown) in which the flow valve isolates the actuator 36 from the source of pressurized fluid in the third position. In this embodiment, the actuator 36 is isolated from the source of pressurized fluid after the tailgate locking mechanism locks the tailgate 31 from opening or the fluid pressure to close the tailgate 31 reaches a relief setting. The actuator 36 can also be isolated from the source of pressurized fluid after a predetermined period of time from the initiation of the opening portion of the cycle at least as great as the time for the open cycle and the close cycle to complete, i.e., the sum of a first predetermined period of time during which the tailgate 31 opens at its full speed, a second predetermined period of time during which the tailgate 31 opens at a slower rate of speed, a third predetermined period of time during which the tailgate 31 closes at its full speed and a fourth predetermined period of time during which the tailgate 31 closes at a slower rate of speed.

Figure 7:
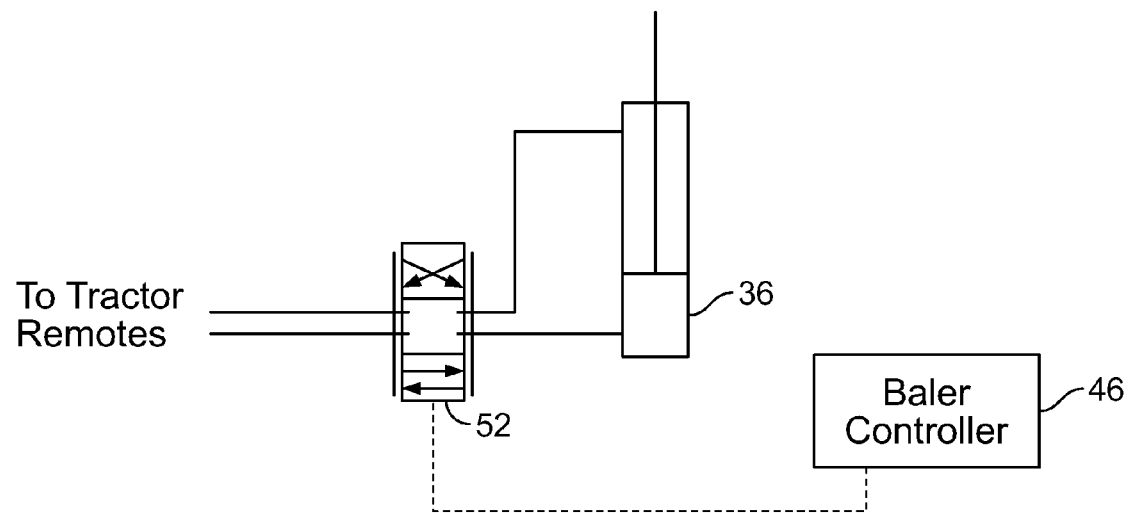
FIG. 7 is a schematic representation of a second fluid system and controller of the instant invention.

The flow valve 52 in FIG. 7 may be a solenoid activated, 3-position proportional control valve or an electro-hydraulic proportional flow control valve. The flow valve 52 may be mounted on the tractor as part of the tractor auxiliary take-off system. As with the FIG. 6 embodiment, the time for the tailgate 31 to near its fully open position from its closed position is determined and programmed into the baler controller 46. If conditions change resulting in a different period of time for the tailgate 31 to near its fully open position, the baler controller 46 can be reprogrammed by the operator to change the period of time during which the tailgate 31 opens more quickly and/or the period of time during which the tailgate 31 opens at a slower rate of speed.

In similar manner, the time for the tailgate 31 to near its fully closed position from its open position is determined and programmed into the baler controller 46. If conditions change resulting in a different period of time for the tailgate 31 to near its fully closed position, the baler controller 46 can be reprogrammed by the operator to change the period of time during which the tailgate 31 closes more quickly and/or the period of time during which the tailgate 31 closes at a slower rate of speed.

The opening portion of the open and close cycle can be initiated manually by pushing a button or repositioning a lever or toggle switch. Depending on the period of time after initiation of the open and close cycle, the flow valve 52 either allows full fluid flow or reduced fluid flow to the actuator 36. When raising the tailgate 31, full flow is provided until the tailgate 31 approaches its fully open position when the tailgate motion is gradually slowed to a stop. As soon as the tailgate 31 has stopped, the flow valve 52 may shift to lower the tailgate 31, again at full speed until the tailgate 31 approaches its fully closed position and then the flow of fluid is reduced to slow the motion of the tailgate 31 and minimize the impact of the tailgate 31 on the tailgate stops. Further, the initial tailgate raise and lower motions could be made to be a ramping function to reduce accelerations, i.e., opening and closing the tailgate in a gradually increasing rate of speed from the initiation of the open cycle and the close cycle until the full opening and closing speed is reached.

The advantage of the present system is that the tailgate 31 automatically opens and closes when signaled by the baler controller 46 without the need of position sensors. The optimal speed of the tailgate 31 can be obtained while minimizing accelerations.

While the invention has been described with reference to a number of preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A round baler comprising:
    a baling chamber having a tailgate in a rear section of the baling chamber, the tailgate being moveable between a closed position wherein the tailgate extends along a back side of the baling chamber and an open position wherein a completely formed bale can be discharged from the baling chamber;
    an actuator connected to the tailgate so as to be capable of moving the tailgate between the open position and the closed position;
    a baler controller configured to calculate a desired flow of pressurized fluid to the actuator and opening and closing times from an available fluid flow rate from a source of pressurized fluid, the baler controller configured to transmit through an electrical connection the desired flow of the pressurized fluid to an additional controller such that the baler controller and the additional controller are configured to control the desired fluid flow to the actuator by controlling a position of a flow valve located in fluid communication between the actuator and a source of pressurized fluid; and
    an activation device manually activatable to commence an open cycle and a close cycle of the tailgate,
    wherein the baler controller is programmed to open the tailgate in an opening cycle at a first rate of speed during a first predetermined period of time and to continue opening the tailgate at a second rate of speed slower than the first rate of speed during a second predetermined period of time.

2. The baler of claim 1, wherein the round baler coupled to a vehicle, and the flow valve is located on the vehicle.

3. The baler of claim 1, wherein the baler controller is programmed to open the tailgate in a gradually increasing rate of speed before the first predetermined period of time.

4. The baler of claim 1, wherein the baler controller is programmed to close the tailgate after the tailgate has completed the opening cycle, the tailgate closing at a third rate of speed during a third predetermined period of time and continuing to close the tailgate at a fourth slower rate of speed during a fourth predetermined period of time.

5. The baler of claim 4, wherein the fourth slower rate of speed is a decreasing rate of speed from the third rate of speed to a zero rate of speed.

6. The baler of claim 4, wherein the baler controller is programmed to close the tailgate in a gradually increasing rate of speed before the third predetermined period of time.

7. The baler of claim 4, wherein the baler controller is programmed to automatically close the tailgate after the tailgate has completed the opening cycle.

8. The baler of claim 1, wherein the flow valve is selected from the group consisting of (a) an electro-hydraulic proportional flow control valve, (b) a solenoid activated, 2-position valve and (c) a solenoid activated, 3-position proportional control valve.

9. A method of opening and closing the tailgate of a round baler comprising:
providing the round baler having a baling chamber with a tailgate in a rear section of the baling chamber, the tailgate being moveable between a closed position wherein the tailgate extends along a back side of the baling chamber and an open position wherein a completely formed bale can be discharged from the baling chamber, and an actuator connected to the tailgate so as to be capable of moving the tailgate between the open position and the closed position, a baler controller electrically connected to a flow valve to control the flow of fluid to the actuator; and an activation device manually activatable to commence an open cycle and a close cycle of the tailgate;
initiating an open cycle in which the tailgate opens at a first rate of speed during a first predetermined period of time and continues to open at a second rate of speed slower than the first rate of speed during a second predetermined period of time;
calculating a desired fluid flow and opening times with the baler controller for the open cycle from an available fluid flow rate from a source of pressurized fluid; and
communicating the calculation of the desired fluid flow from the baler controller to an additional controller so that the baler controller and the additional controller control the desired fluid flow to the actuator by controlling a position of the flow valve.

10. The method of claim 9, wherein the second slower rate of speed is a decreasing rate of speed from the first rate of speed to a zero rate of speed.

11. The method of claim 9, further comprising opening the tailgate in a gradually increasing rate of speed before the first predetermined period of time.

12. The method of claim 9, wherein the flow valve is selected from the group consisting of (a) an electro-hydraulic proportional flow control valve, (b) a solenoid activated, 2-position valve and (c) a solenoid activated, 3-position proportional control valve.

13. The method of claim 9, wherein the flow valve fluidly isolates the actuator from the source of pressurized fluid after (a) a tailgate locking mechanism locks the tailgate from opening, or (b) the fluid pressure to close the tailgate reaches a relief setting.

14. The method of claim 9, wherein an operator can change (a) the first predetermined period of time, (b) the second predetermined period of time or (c) the first predetermined period of time and the second predetermined period of time.

15. The method of claim 9, wherein after the second predetermined period of time, the tailgate closes at a third rate of speed during a third predetermined period of time and continues to close at a fourth rate of speed slower than the third rate of speed during a fourth predetermined period of time.

16. The method of claim 15, wherein the fourth slower rate of speed is a decreasing rate of speed from the third rate of speed to a zero rate of speed.

17. The method of claim 15, further comprising closing the tailgate in a gradually increasing rate of speed before the third predetermined period of time.

18. The method of claim 15, wherein the tailgate closes after the second predetermined period of time without manual intervention.

19. The method of claim 15, wherein the flow valve fluidly isolates the actuator from the source of pressurized fluid after a predetermined period of time from the initiation of the open cycle and the close cycle, the predetermined period of time being at least as great as the sum of the first predetermined period of time, the second predetermined period of time, the third predetermined period of time and the fourth predetermined period of time.

20. The method of claim 15, wherein an operator can change (a) the third predetermined period of time, (b) the fourth predetermined period of time or (c) the third predetermined period of time and the fourth predetermined period of time.

* * * * *